US008515462B2

(12) United States Patent　　(10) Patent No.: US 8,515,462 B2
Courau et al.　　(45) Date of Patent: Aug. 20, 2013

(54) METHOD FOR CONNECTION RE-ESTABLISHMENT IN A MOBILE COMMUNICATION SYSTEM

(75) Inventors: François Courau, Meudon (FR); Laurent Thiebaut, Antony (FR)

(73) Assignee: Alcatel Lucent, Paris (FR)

( * ) Notice: Subject to any disclaimer, the term of this patent is extended or adjusted under 35 U.S.C. 154(b) by 23 days.

(21) Appl. No.: 11/556,733

(22) Filed: Nov. 6, 2006

(65) Prior Publication Data
US 2007/0117575 A1　May 24, 2007

(30) Foreign Application Priority Data

Nov. 7, 2005　(EP) .................................... 05292351

(51) Int. Cl.
*H04W 68/00*　(2009.01)
*H04W 4/00*　(2009.01)
*H04W 36/00*　(2009.01)

(52) U.S. Cl.
USPC ............... 455/458; 455/435.1; 455/432.1; 455/436; 370/331

(58) Field of Classification Search
USPC .............. 455/411, 426.1, 452.2, 458, 432.1, 455/436, 435.1; 726/18, 19; 713/153; 379/142.05; 340/170, 416.21; 370/331
See application file for complete search history.

(56) References Cited

U.S. PATENT DOCUMENTS

| | | | |
|---|---|---|---|
| 5,438,609 A * | 8/1995 | Yahagi | 455/456.1 |
| 5,749,053 A * | 5/1998 | Kusaki et al. | 455/524 |
| 6,678,256 B1 * | 1/2004 | Sato | 370/310.1 |
| 6,792,278 B1 * | 9/2004 | Ahmavaara et al. | 455/461 |
| 6,853,627 B1 * | 2/2005 | Evans | 370/312 |
| 7,486,966 B2 * | 2/2009 | Sayers et al. | 455/555 |
| 7,957,736 B1 * | 6/2011 | Haumont | 455/435.1 |
| 2002/0049066 A1 * | 4/2002 | Muhonen et al. | 455/503 |
| 2002/0083197 A1 * | 6/2002 | Jung et al. | 709/238 |
| 2002/0151307 A1 * | 10/2002 | Demarez et al. | 455/445 |
| 2003/0061480 A1 * | 3/2003 | Le et al. | 713/153 |
| 2003/0208628 A1 * | 11/2003 | Karjanlahti | 709/249 |
| 2003/0212827 A1 * | 11/2003 | Saha et al. | 709/247 |
| 2003/0223383 A1 | 12/2003 | Chang | |
| 2004/0157626 A1 * | 8/2004 | Park et al. | 455/458 |
| 2004/0185837 A1 * | 9/2004 | Kim et al. | 455/414.3 |
| 2004/0203771 A1 * | 10/2004 | Chang et al. | 455/435.1 |
| 2005/0002407 A1 * | 1/2005 | Shaheen et al. | 370/401 |
| 2005/0185623 A1 * | 8/2005 | Ray et al. | 370/338 |
| 2006/0035661 A1 * | 2/2006 | Niwano et al. | 455/522 |

* cited by examiner

*Primary Examiner* — Christopher M Brandt
(74) *Attorney, Agent, or Firm* — Harness, Dickey & Pierce

(57) ABSTRACT

One object of the invention is a method for connection re-establishment in a mobile communication system, comprising:

a step wherein a network entity in charge of initiating a paging procedure for a mobile station in idle mode sends a paging request carrying mobility management context information and/or service management context information related to said mobile station, a step wherein, upon the reception of said paging request, network entities in charge of communication over the radio interface in the paging area, store said mobility management context information and/or service management context information and send a paging message over said radio interface, a step wherein a network entity receiving a response to said paging message from said mobile station over said radio interface uses said stored mobility management context information and/or service management context information, for said connection re-establishment over said radio interface for said mobile station.

10 Claims, 2 Drawing Sheets

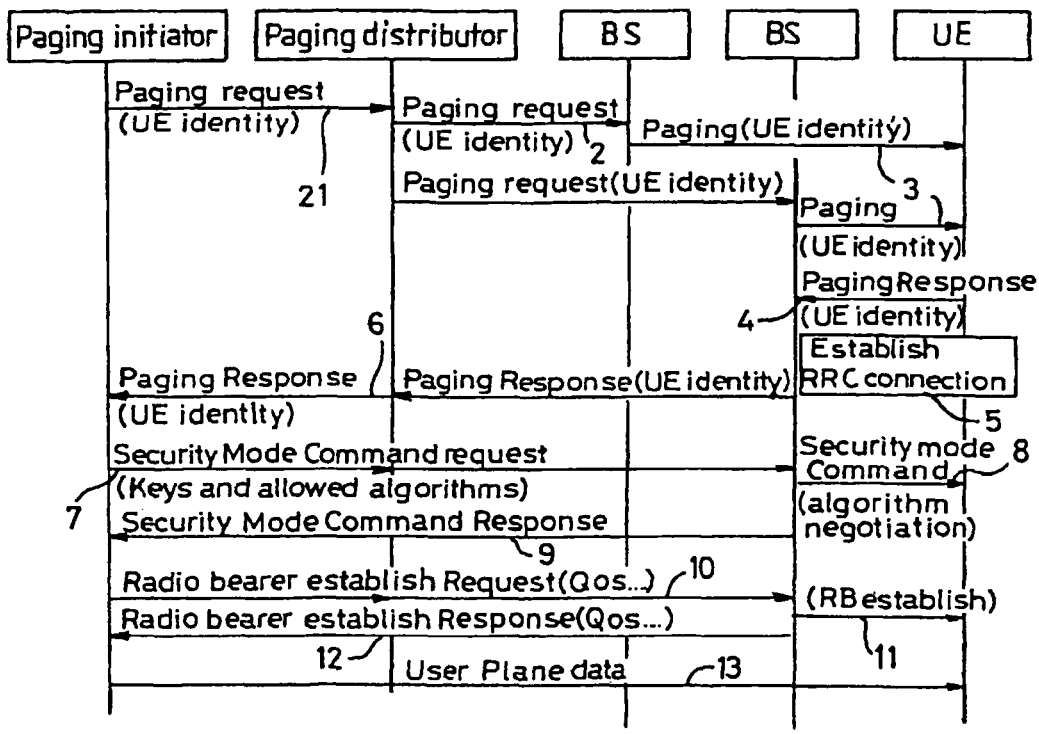

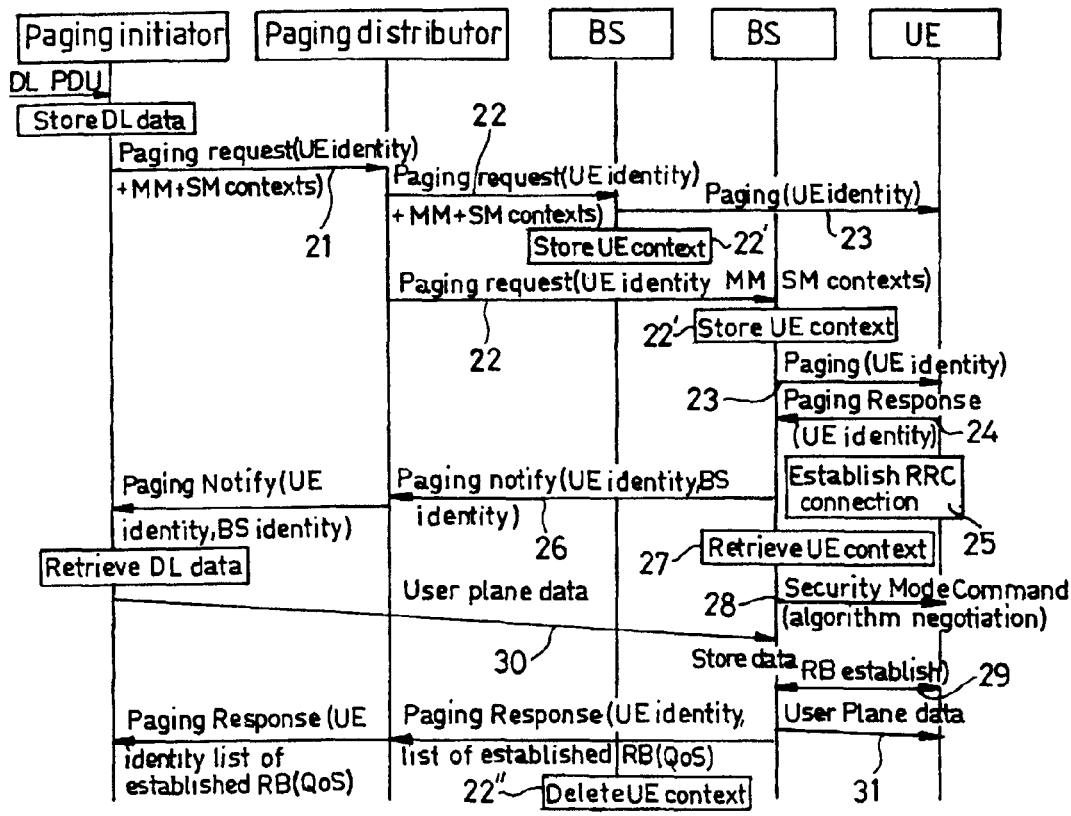
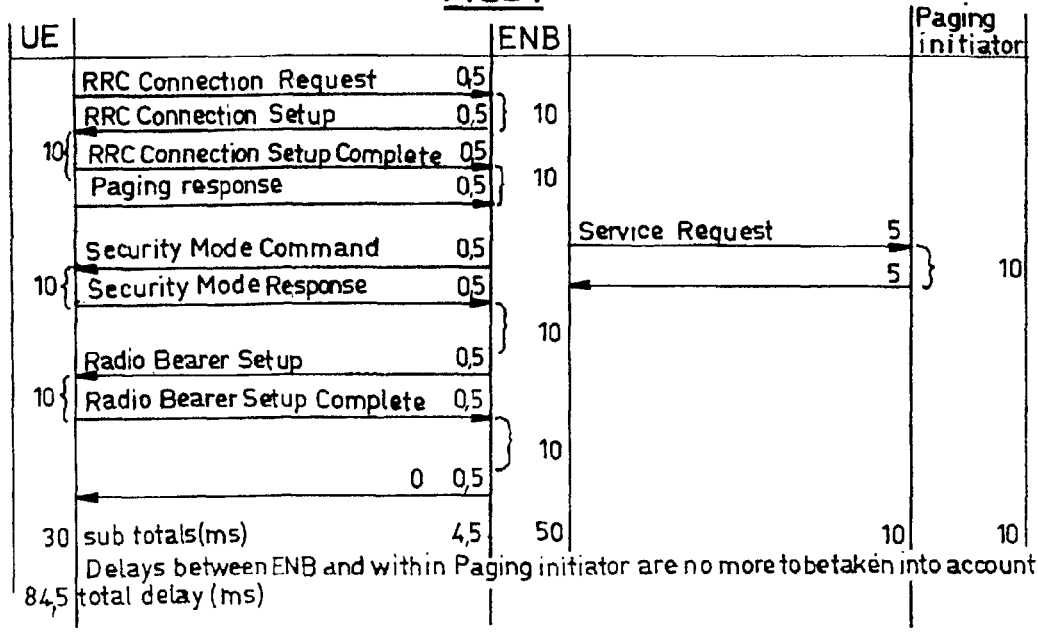

METHOD FOR CONNECTION RE-ESTABLISHMENT IN A MOBILE COMMUNICATION SYSTEM

CROSS-REFERENCE TO RELATED APPLICATIONS

This application is based on European Patent Application No. 05292351.3 filed Nov. 7, 2005, the disclosure of which is hereby incorporated by reference thereto in its entirety, and the priority of which is hereby claimed under 35 U.S.C. §119.

BACKGROUND OF THE INVENTION

1. Field of the Invention

The present invention generally relates to mobile communication systems.

In a general way, mobile communication systems are subject to standardisation; therefore details on such systems can be found in the corresponding standards, published by the corresponding standardisation bodies.

2. Description of the Prior Art

It is simply recalled that such systems, such as for example 3GPP (2G-3G) systems, comprise:
- Mobile Stations (MS), also called User Equipments (UE)
- a Radio Access Network (RAN), in turn comprising Base Stations (BS) also called Node B, and Base Station Controllers (BSC) also called Radio Network Controllers (RNC),
- a Core Network (CN), in turn comprising entities such as in particular Mobile Switching Center (MSC) for a Circuit Switched (CS) domain, and Serving GPRS Support Nodes (SGSN) for a Packet-Switched (PS) domain.

It is recalled that in such systems, establishing a connection with a mobile station requires establishing a signalling (or control plane) connection, and a user plane connection.

It is also recalled that, from a Mobility Management (MM) point of view, for the CN PS domain, a mobile station moves from a so-called idle mode to a so-called connected mode when a signalling connection is established for this mobile station, or moves back from the connected mode to the idle mode when the signalling connection is released due e.g. to inactivity of the mobile station.

It is also recalled that in idle mode the CN only keeps track of the mobile station within the accuracy of a set of cells, also called Location Area (LA), or Routing Area (RA) in the case of the PS domain, and a paging procedure is required before establishing a connection with a mobile station in idle mode.

In the case of a packet connection, the signalling connection may be released by the network when there is not enough activity on the user plane connection. If there is again some activity, a problem is the delay introduced by the re-establishment of a connection, which is a relatively long process, requiring a relatively high number of steps, according to usual procedures, as now recalled in relation with FIG. 1.

At step 1, a network entity in charge of initiating a paging procedure, or paging initiator (e.g. SGSN) sends a paging request to network entities, or paging distributors (e.g. RNC or BSC/PCU (Packet Control Unit)), in charge of forwarding the paging request to all BS/Node B of the Location Area (LA) or Routing Area (RA) where the MS/UE has previously been localized.

At step 2, each paging distributor forwards the paging request to all BS/Node B of the Location Area (LA) or Routing Area (RA) where the MS/UE has previously been localized.

At step 3, paging messages are sent from each BS/Node B of the LA/RA over the radio interface. These messages contain the identity of the MS/UE to be paged.

At step 4, a paging response is sent by the MS/UE to a BS/Node B, or serving BS/Node B. The UE answers to the paging request, with the value of UE/MS's identity used in the paging message.

At step 5, a signalling connection, or RRC (Radio Resource Control) connection is established between the MS/UE and the serving BS/Node B.

At step 6, the paging response of the MS/UE is forwarded by the serving BS/Node B to the paging distributor, and further on by this paging distributor to the paging initiator.

At step 7, a security mode command is sent by the paging initiator (e.g. SGSN) to the serving BS/Node B, to establish mobility and security (MM) contexts of the MS/UE (this security mode command carrying parameters such as ciphering and integrity keys, and allowed algorithms).

At step 8, the serving BS/Node B commands the MS/UE to apply the security parameters received from the paging initiator (e.g. SGSN) and security algorithms are negotiated. Though not specifically illustrated in FIG. 1, step 8 comprises a first step wherein the serving BS/Node B sends a security mode command to the MS/UE, and a second step wherein the MS/UE sends a security mode response to the serving BS/Node B.

At step 9, a security mode complete is sent in response from the serving BS/Node B to the paging initiator (SGSN).

At step 10, a RAB (Radio Access Bearer) assignment request is sent from the paging initiator (SGSN) to the serving BS/Node B (this assignment request containing such parameters as parameters describing the QoS properties of the bearers to be established for the MS/UE).

At step 11, a RB (Radio Bearer), for user plane connection, is established between the serving BS/Node B and the MS/UE. Though not specifically illustrated in FIG. 1, step 11 comprises a first step wherein the serving BS/Node B sends a Radio Bearer setup request to the MS/UE, and a second step wherein the MS/UE sends a Radio Bearer setup complete to the serving BS/Node B.

At step 12, a RAB assignment response is sent from the serving BS/Node B to the paging initiator (SGSN).

At step 13, the MS/UE can actually receive the data.

FIG. 2 is intended to illustrate an example of calculation of the setup delays with a method according to the prior art as recalled in FIG. 1.

The assumptions for delay calculation in this example are as follows:

Transmission time:
between CN and BS/ENB (due to microwave transport): 5 ms
from BS/ENB to BS/ENB (due to 2 hops of microwave): 8 ms
air interface (assuming RRC messages can be transmitted in 1 TTI (Transmission Time Interval)): 0.5 ms
Processsing time:
UE internal processing time for RRC messages: 10 ms
ENB internal time for signalling messages: 10 ms (assumed to be the same as RRC processing time in UE/MS)
Paging initiator (CN) internal processing time for signalling messages: 10 ms (assumed to be the same as RRC processing time in UE/MS)

In this example, it can be seen that the total delay at the MS/UE is 165 ms.

SUMMARY OF THE INVENTION

As recognized by the present invention, such a process is not optimised, in particular it induces a too long delay between a paging (due to incoming data such as an IP packet) received by a MS/UE and the moment where the MS/UE actually receives this data (the IP packet) over the radio interface.

As further recognized by the present invention, such a process is not adapted in the context of future generation network and service architecture evolution, where one of the main objectives is to reduce setup delays and user plane latency.

As further recognized by the present invention, there is especially a need to reduce the time to move a MS/UE from idle mode to a mode called active mode, where the MS/UE actually receives data sent by the network.

As further recognized by the present invention, there is especially a need to optimize the process of transferring an UE/MS from idle to active mode at network initiative, for IMS (IP Multimedia Subsystem) services. Indeed, with the possibility for the network to send call initiation messages (INVITE) or Instant messaging (MESSAGE) the procedure of transferring an UE/MS from idle to active mode at network initiative becomes much more frequent and has much more stringent real time requirements.

The present invention in particular enables to solve part or all of the above-mentioned problems, or to avoid part or all of the above-mentioned drawbacks. More generally, the present invention enables to improve the quality of service in such systems.

These and other objects are achieved, in one aspect of the present invention, by a method for connection re-establishment in a mobile communication system, comprising:
 a step wherein a network entity in charge of initiating a paging procedure for a mobile station in idle mode sends a paging request carrying mobility management context information and/or service management context information related to said mobile station,
 a step wherein, upon the reception of said paging request, network entities in charge of communication over the radio interface in the paging area, store said mobility management context information and/or service management context information and send a paging message over said radio interface,
 a step wherein a network entity receiving a response to said paging request from said mobile station over said radio interface uses said stored mobility management context information and/or service management context information, for said connection re-establishment over said radio interface for said mobile station.

These and other objects are achieved, in another aspect of the present invention, by a network entity for a mobile communication system, comprising:
 means for sending a paging request towards a mobile station in idle mode, said paging request carrying mobility management context information and/or service management context information related to said mobile station.

These and other objects are achieved, in another aspect of the present invention, by a network entity for a mobile communication system, comprising:
 means for, upon the reception of a paging request carrying mobility management context information and/or service management context information related to a mobile station, storing said mobility management context information and/or service management context information related to said mobile station.

These and other objects are achieved, in another aspect of the present invention, by a network entity for a mobile communication system, comprising:
 means for, upon reception from a mobile station of a response to a paging message, using stored mobility management context information and/or service management context information related to this mobile station, for connection re-establishment over the radio interface for said mobile station.

BRIEF DESCRIPTION OF THE DRAWINGS

These and other objects of the present invention will become more apparent from the following description taken in conjunction with the accompanying drawings:

FIG. 1 is intended to recall an example of a method for the establishment of a connection, according to the prior art, FIG. 2 is intended to illustrate the setup delays with a method according to the prior art as recalled in FIG. 1, FIG. 3 is intended to illustrate an example of a method for the establishment of a connection, according to the present invention, FIG. 4 is intended to illustrate the setup delays with a method according to the present invention, for example as illustrated in FIG. 3.

MORE DETAILED DESCRIPTION OF THE INVENTION

The present invention may also be explained as follows.

The present invention in particular proposes that the Paging request received by the BS/Node (or ENB (Enhanced Node B) in the context of future generation networks) contains (together with the identity of the UE to be paged) mobility management (identifier, security, . . . ) and radio bearers context for the UE/MS. All BS/Node B/ENB store these information before sending a paging message on the radio interface. Thus the BS/Node B/ENB on which the UE/MS appears (on which the UE/MS answers to the paging request) can re-establish immediately the security link with the UE/MS and the Radio bearers for the UE/MS without having to wait for explicit requests from the Paging Initiator.

In other words, the present invention proposes a method for connection re-establishment, comprising:
 a step wherein a network entity in charge of initiating a paging procedure for a mobile station in idle mode sends a paging request carrying mobility management context information and/or service management context information related to said mobile station,
 a step wherein, upon the reception of said paging request, network entities in charge of communication over the radio interface in the paging area, store said mobility management context information and/or service management context information and send a paging message over the radio interface,
 a step wherein a network entity receiving a response to said paging request from said mobile station over said radio interface uses said stored mobility management context information and/or service management context information, for said connection re-establishment over said radio interface for said mobile station.

In particular, said mobility management context information may comprise at least one information in a group comprising: security information, user identities, user access rights (for example for cell selection at handover) . . . etc.

In particular, said security information may comprises ciphering and integrity keys.

In particular, said service management context information may comprise QoS properties of bearers to be established for said mobile station.

In particular, said mobility management context information may comprise information stored in the network as a result of a last authentication event performed for said mobile station.

In particular, said service management context information may comprise information stored in the network as a result of a service request received by said network for said mobile station.

Advantageously, the method further comprises:
a step wherein said network entities delete the thus stored information, at the expiration of a timer, if they have not received a response from said mobile station to said paging message at the expiration of said timer.

An example of a method according to the present invention is illustrated in FIG. 3.

At step 21, a network entity in charge of initiating a paging procedure, or paging initiator (e.g. SGSN or the equivalent in Long Term Evolution networks) sends a paging request to network entities, or paging distributors (e.g. RNC or BSC/PCU (Packet Control Unit) for legacy networks), in charge of forwarding the paging request to all BS/Node B/enhanced Node B of the Location Area (LA) or Routing Area (RA) or Tracking Area (TA) (where TA is a more general term covering in particular the term LA/RA) where the MS/UE has previously been localized.

Contrary to what is the case in the prior art as recalled in FIG. 1, this paging request carries information about:
MM context: the mobility and security contexts (information such as user identities, user rights for cell selection at Hand-Over, ciphering and integrity keys negotiated between network and UE/MS as a result of last authentication of the UE/MS) of the UE/MS to page
SM context: The service contexts (e.g. Radio Bearers (RB) with their QoS parameters to later establish for the UE)

At step 22, each paging distributor forwards the paging request to all BS/Node B of the Location Area (LA) or Routing Area (RA) or Tracking Area (TA) where the MS/UE has previously been localized.

At step 22', each BS/ENB stores temporarily the MM and SM context associated with the UE/MS. Each BS/ENB associates a timer with this storage. If at the expiry of this timer, the UE/MS has not appeared in the local cell, the contextual information associated with the UE/MS is silently deleted, as illustrated at step 22".

At step 23, paging messages are sent from each BS/Node B of the LA/RA over the radio interface. These messages contain the identity of the MS/UE to be paged.

At step 24, a paging response is sent by the MS/UE to a BS/Node B, or serving BS/Node B. The UE answers to the paging request, with the value of UE/MS's identity used in the paging message.

At step 25, a signalling connection, or RRC (Radio Resource Control) connection is established between the MS/UE and the serving BS/Node B.

At step 26, a paging notify of the MS/UE (including UE identity and BS identity) is sent by the serving BS/Node B to the paging distributor controlling this serving BS/Node B, and further on by this paging distributor to the paging initiator.

At step 27, the serving BS/ENB retrieves
the mobility and security (MM) contexts associated with the MS/UE
The service (SM) contexts (e.g. Radio Bearers) associated with the MS/UE.

At step 28, the serving BS/ENB commands the MS/UE to apply the security mode commands using corresponding information from the retrieved MM context.

At step 29, a RB (for user plane connection) is established between the serving BS/ENB and the MS/UE, using corresponding information from the retrieved SM context.

A paging response (including UE identity and list of established RB (QoS)) is sent by the serving BS/ENB to the paging distributor, and further on by the paging distributor to the paging initiator.

As illustrated at steps 30 and 31, the MS/UE can actually receive the data.

Thus, contrary to the prior art recalled in relation with FIG. 1, the security and RB establishment procedures are not initiated by the paging initiator (e.g. SGSN), which usually stores the MM and SM context information, but by the serving BS/ENB to which MM and SM context information related to the considered MS/UE are transferred, by means of the paging procedure. Therefore, contrary to the prior art recalled in relation with FIG. 1, there is no need for the serving BS/ENB to wait for a request from the paging initiator (e.g. SGSN), and therefore the overall process is shortened.

FIG. 4 is intended to illustrate an example of a calculation of the setup delays with a method according to the present invention, for example as illustrated in FIG. 3. The assumptions for the delay calculation are the same than in FIG. 2.

It can be seen that in this example the total delay for a MS/UE is 84.5 ms (which is much shorter than 165 ms with a method according to the prior art as recalled in FIGS. 1 and 2).

Therefore, there is much much shorter time than in the prior art to wake-up the MS/UE when the network has got data to send to the mobile and the MS/UE is in idle mode. This allows to reduce the delay required to set up a connection, in particular to establish a session such as an IMS session.

The present invention also has for its object a network entity comprising means for carrying out a method according to the present invention, for example as disclosed above in connection with FIG. 3.

The detailed implementation of the above-mentioned means does not raise any special problem for a person skilled in the art, and therefore such means do not need to be more fully disclosed than has been made above, by their function, for a person skilled in the art.

The invention claimed is:

1. A method for re-establishment of a connection for an User Equipment UE in a packet mobile communication system, said method comprising:
a serving GPRS support node (SGSN) sending a paging request for said UE, said paging request including Mobility Management Context and Service Context information for said UE,
a plurality of Base Stations receiving said paging request and storing said Mobility Management Context and Service Context information,
a Base Station of said plurality of Base Stations receiving an answer from said UE to said paging request, using said stored information to re-establish said connection for said UE without having to wait for explicit request from said SGSN.

2. A method according to claim 1, wherein:
said Mobility Management Context information includes information that would have been carried by an explicit Security Mode Command request from said SGSN.

3. A method according to claim 1, wherein:
said Service Context information includes information that would have been carried by an explicit request from said SGSN for bearer establishment for said UE.

4. A serving GPRS support node (SGSN) of a packet mobile communication system, said SGSN configured to, for re-establishment of a connection for an User Equipment UE:

send a paging request for said UE, said paging request including Mobility Management Context and Service Context information for said UE, such that said connection can be re-established using said Mobility Management Context and Service Context information stored at a Base Station for said UE without having to wait for explicit request from said SGSN.

5. An SGSN according to claim 4, wherein:
said Mobility Management Context information includes information that would have been carried by an explicit Security Mode Command request from said SGSN.

6. An SGSN according to claim 4, wherein:
said Service Context information includes information that would have been carried by an explicit request from said SGSN for bearer establishment for said UE.

7. A Base Station of a packet mobile communication system, said Base Station configured to, for re-establishment of a connection for an User Equipment UE:

store Mobility Management and Service Context information for said UE carried by a paging request received by said Base Station, upon receiving an UE answer to said paging request, use said stored information to re-establish said connection for said UE without having to wait for explicit request from a serving GPRS support node (SGSN).

8. A Base Station according to claim 7, wherein:
a timer is associated with said storage.

9. A Base Station according to claim 7, wherein:
said Mobility Management Context information includes information that would have been carried by an explicit Security Mode Command request from said SGSN.

10. A Base Station according to claim 7, wherein:
said Service Context information includes information that would have been carried by an explicit request from said SGSN for bearer establishment for said UE.

* * * * *